United States Patent

[11] 3,624,809

| [72] | Inventor | Duane H. Beninga<br>Arvada, Colo. |
|---|---|---|
| [21] | Appl. No. | 21,856 |
| [22] | Filed | Mar. 23, 1970 |
| [45] | Patented | Nov. 30, 1971 |
| [73] | Assignee | Coors Porcelain Company<br>Golden, Colo. |

[54] CERAMIC SEAL
1 Claim, 3 Drawing Figs.

[52] U.S. Cl. .................................................... 277/92
[51] Int. Cl. ...................................................... F16j 15/34
[50] Field of Search ............................................ 277/81, 92, 96; 161/196, 207

[56] References Cited
UNITED STATES PATENTS
2,994,547  8/1961  Dolhun et al. .................. 277/92

| 2,296,724 | 9/1942 | McCormack.................. | 277/92 |
| 2,733,789 | 2/1956 | Tolle ............................. | 161/196 |
| 3,108,816 | 10/1963 | Moore........................... | 277/96 X |
| 3,197,290 | 7/1965 | Williams....................... | 161/207 X |

FOREIGN PATENTS
| 1,032,433 | 6/1966 | Great Britain................ | 161/196 |
| 1,050,298 | 12/1966 | Great Britain................ | 277/92 |

*Primary Examiner*—Robert I. Smith
*Attorney*—Barnard, McGlynn & Reising

ABSTRACT: A composite ring seal for rotary shafts and the like including an aluminum oxide base ceramic ring, the outer diameter face being metallized and having a rubber annulus bonded thereto. This article may be secured to a rotating assembly such that an axial face of the ceramic ring abuts the axial face of another ring on a fixed assembly to effect a seal. The rubber annulus operates to support the ring and may be compressed by maintaining the seal rings in engagement.

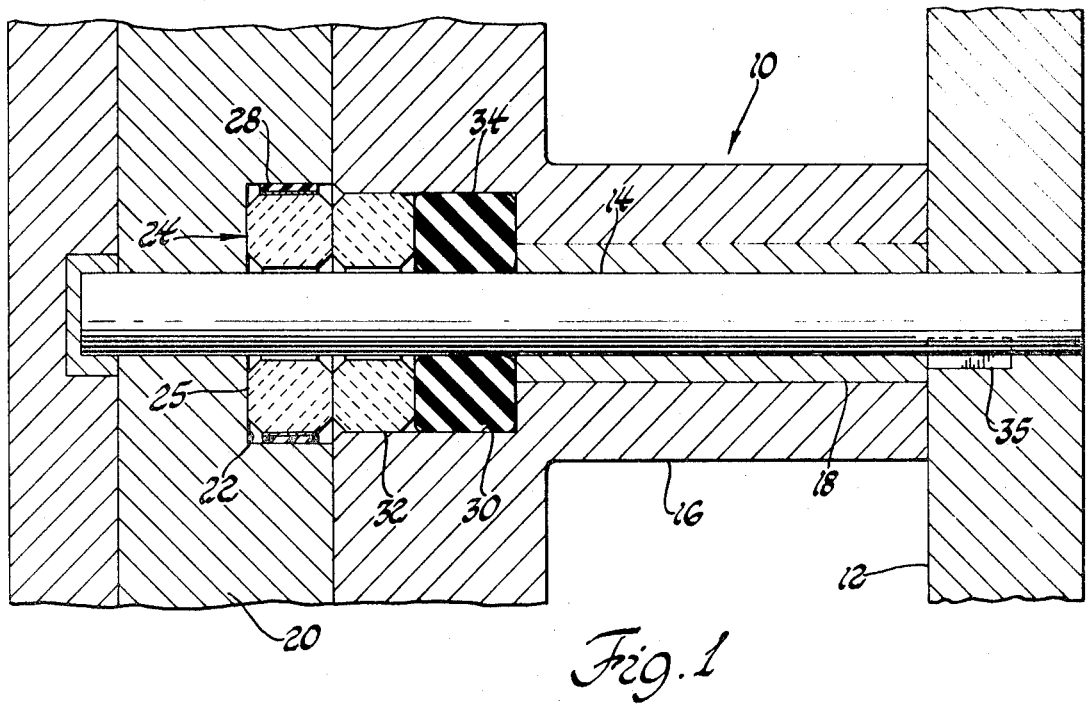

CERAMIC SEAL

This invention relates to seals and particularly to ceramic ring seals for rotary shafts and the like.

It is well known that the wear and corrosion resistant qualities of certain dense ceramic materials would be of great advantage in the art of rotary seals. However, such dense ceramic materials have not found great acceptance in such applications. This is believed to be due principally to the fact that a ceramic ring seal requires the bonding of an elastomeric material such as natural or synthetic rubber to the ceramic and good bonds between elastomers and dense ceramics have been difficult or impossible to achieve. The requirement for a strong ceramic-to-rubber bond can sometimes be obviated by means of a wedge fit, but this often leads to a rupture of the ceramic due to mechanical overload or thermal shock.

The present invention affords an improved ceramic ring seal for rotating structures wherein a true fluid seal is realized without subjecting the ceramic ring or rings to undue mechanical loads. In general, this is accomplished by means of a ceramic ring seal which comprises a ring of dense metal oxide base ceramic having an outer diameter surface and a seal surface, the outer diameter surface being metallized and bonded to an annulus of elastomeric material such as synthetic rubber. This article may be secured in place simply by compressing the elastomeric material and urging it into position adjacent the complementary seal structure.

In a specific form of the invention, fixed and rotatable alumina base ceramic rings are disposed axially side-by-side and having flat polished surfaces in mutual engagement. Each ring has an outer diameter surface which is metallized and has bonded thereto an elastomeric annulus which in turn engages a metal support structure. The elastomeric annulus may be either a simple band or, alternatively, a semicupped annulus which supports two sides of the seal ring. The latter annulus may so resiliently support the ring as to obviate the need for springs, bellows and other prior art seal elements.

The various features and advantages of the subject invention will be better understood upon reading the following specification which describes two specific embodiments of the invention. This specification is to be taken with the accompanying drawing of which:

FIG. 1 is a side view in cross section of a first embodiment of the invention as applied to a water pump;

FIG. 2 is an enlarged view of a detail of the apparatus of FIG. 1; and

FIG. 3 is a side view in cross section of a second embodiment of the invention as applied to transmissions.

Referring to FIG. 1, a water pump assembly 10 is shown to comprise a pulley 12 which is fixed to a shaft 14 such that the combination is rotatable relative to a water pump housing 16. A sleeve bearing 18 is disposed within the water pump housing 16 so as to provide a suitable load-bearing surface for the shaft 14. Shaft 14 extends through the water pump housing 16 and is connected to an impeller 20 which rotates with the shaft 14 and the pulley 12.

Impeller 20 has formed therein a cylindrical recess 22 which is concentric with the axis of shaft 14 and which opens to the right-hand face of the impeller 20, as shown in FIG. 1. The recess 22 is of the proper depth to fully receive a first ceramic seal ring assembly 24. The assembly 24 includes a metal oxide base ceramic ring 25 having unnumbered inner and outer diameter surfaces and axially opposed seal surfaces. All surfaces are polished flat and are separated from one another by beveled corners. The ring 25 is fabricated by compacting and sintering a powdered material containing upwards of 85 percent by weight aluminum oxide and the remainder small amounts of glass forming oxides such as silica. Examples of dense, high alumina sintered ceramics are: 100 percent aluminum oxide; 99.5 percent aluminum oxide, 0.5 percent chromium oxide; 85 percent aluminum oxide, 10 percent silica, 3 percent calcium oxide and 2 percent magnesium oxide.

As best shown in FIG. 2, the outer diameter surface of ring 25 is coated with a metallized layer 26 in such a fashion as to create a chemical bond of the metal layer 26 to the dense ceramic. This layer 26 is preferably applied by forced mechanical contact between a solid metal such as titanium or zirconium and the outer diameter layer of ring 25. This may be carried out by "brushing" needles or filaments of the metal over the ring 25 or by tumbling the rings 25 with metal elements for a period of hours. The great affinity of titanium and zirconium for oxygen produces a chemical bond with the aluminum oxide base ring 25. Other metallizing techniques may also be used such as applying slurries of lithium molybdate or molymanganese and firing them in a reducing atmosphere.

To the metallized outer diameter surface of ring 25 is bonded a ring 28 of elastomeric material having high chemical resistance such as buna-N, synthetic rubber. Other elastomers which may be used are natural rubber, polyurethane, butyl rubber, polychloroprene, etc. The ring is bonded adhesively or by vulcanizing to the outer diameter surface of ring 25 to complete the assembly 24. This assembly 24 is then inserted into the recess 22 by compressing the elastomeric annulus 28. Assembly 24, thus, rotates with impeller 20.

The water pump housing 16 is also formed with a cylindrical recess 30 which is symmetrically disposed about the axis of shaft 14 and which opens to the left-hand face of the housing, as shown in FIG. 1. Disposed within the recess 30 is the axially adjacent combination of a second ceramic seal ring 32 and an elastomeric annulus 34. Seal ring 32 is preferably but not necessarily identical in material to ceramic seal ring 24; i.e., it may be steel but is preferably a dense ceramic. Annulus 34 is compressed between the axial surface of ring 32 and the end wall of recess 30 so as to act as a spring cushion maintaining the exposed axial surfaces of rings 25 and 32 in mutual engagement. Since ring 32 is fixed to the nonrotating housing 16, the engaging surfaces of rings 25 and 32 simply slide over one another.

Pulley 12 is preferably keyed to the shaft 14 by means of a keyway 35 such that rotation of the pulley 12 causes rotation of the shaft 14 and the water pump impeller 20 which is carried by shaft 14. The polished, flat, mating surfaces of the ceramic seal rings 24 and 32 slide over one another producing a long-wearing seal having good dimensional stability. It is to be noted that annulus 34 may be made of considerably greater axial depth than shown to increase the axial resilience thereof. The annulus 34 may thus take the place of such complicated seal elements as washers, springs, bellows, and the like.

Referring now to FIG. 3, there is shown a transmission assembly 36 comprising a stationary transmission case 38 which is adapted to receive a ball bearing assembly 40 of which the inner race is secured to a shaft 42 for rotation therewith. Although not shown, it is to be understood that a typical gear may be mounted on the right-hand end of the shaft 42, i.e., to the right of the ball bearing assembly, as shown in FIG. 3. Shaft 42 extends through and is secured to a first metal cup 44 which has formed therein an annular recess 46. Disposed within the recess 46 in axially adjacent relationship are a flat-sided, sintered ceramic seal ring 48 and an elastomeric annulus 50 which is formed with a thin ring portion 49 engaging the outer diameter surface of ring 48 and a thick portion disposed between the inner axial surface of ring 48 and the end wall of cup 44. The outer diameter and inner axial faces of ring 48 are metallized as previously described and bonded to the annulus 50.

Shaft 42 also extends into a second metal cup 52 which is disposed within a cylindrical bore in the transmission case 38. Shaft 42 turns freely within the central axial bore of the metal cup 52 such that the cup remains stationary with the transmission case 38. The metal cup 52 is formed with an annular recess which receives the combination of an elastomeric annulus 56 and a second ceramic seal ring 58, ceramic ring 58 being generally identical to ring 48 and having a right-hand, flat, polished surface thereof in sliding engagement with the left-hand, flat, polished surface of ring 48. Ring 58 is cushioned within an elastomeric annulus 56, such that the annulus engages both the outer diameter and axially inner surfaces of ring 58. In the embodiment of FIG. 3, the outer and axially inner surfaces of ring 58 are metallized and bonded to the annulus 56. The annuli 50 and 56 are tightly compressed into the cups 44 and 52 so as to bias the rings 48 and 58 both axially and radially.

In operation, the assembly of FIG. 3 permits the rotation of shaft 42 and the seal ring assembly including ring 48 and cup 44 relative to the fixed combination of transmission case 38 and metal cup 52. Accordingly, a long-wearing fluid seal is accomplished by the engaging surfaces of the axially adjacent ceramic seal rings 48 and 58 each of which is resiliently carried within an elastomeric annulus.

It is to be understood that the seal of the subject invention may be used in many applications and is not limited to use in water pumps and transmission cases as illustrated herein. Accordingly, the foregoing descriptions are not to be construed in a limiting sense.

The embodiments of the invention in which an exclusive property or privilege is claimed are defined as follows:

1. A composite seal ring adapted to be fitted into a recess around a shaft and having an axial annular end surface for sliding relatively moveable contact with another annular surface to provide a seal between members which are in relatively rotatable relationship with respect to each other, said composite seal ring comprising a ring of sintered aluminum oxide base ceramic containing at least about 85 percent by weight aluminum oxide, and a ring of elastomeric material disposed around said ceramic ring and bonded to said ceramic ring through an intermediate thin layer of metal which is bonded to said ceramic ring.

* * * * *